Figure 1:
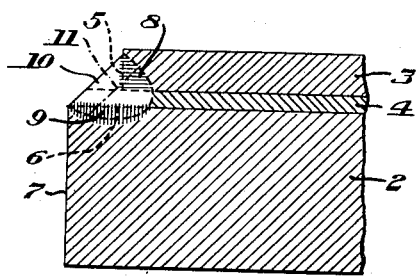

Jan. 9, 1951   W. A. CARLSON ET AL   2,537,207
BIMETALLIC BILLET
Original Filed Sept. 6, 1945

INVENTORS
WILLIAM A. CARLSON
& WALTER A. KEIL

Patented Jan. 9, 1951

2,537,207

UNITED STATES PATENT OFFICE 2,537,207

BIMETALLIC BILLET

William A. Carlson, Pittsburgh, and Walter A. Keil, Bridgeville, Pa., assignors to Superior Steel Corporation, Pittsburgh, Pa., a corporation of Virginia Continuation of applications Serial Nos. 614,746 and 614,747, September 6, 1945. This application May 26, 1950, Serial No. 164,556

2 Claims. (Cl. 29—196.1)

This invention relates to bimetallic billets. It relates particularly to bimetallic billets comprising components of high carbon steel and straight chrome type stainless steel. This application is a continuation of our copending applications Serial Nos. 614,746 and 614,747, filed September 6, 1945, now abandoned.

Great difficulty has been encountered in the making, heating and rolling of bimetallic billets comprising components of high carbon steel and straight chrome type stainless steel welded together. It has been found that even though a low carbon steel welding rod is used the weld which is formed between the billet components is brittle and does not stand up under heating and rolling of the billet. Indeed, the weld generally cracks even before the billet is heated for rolling. In any event, it has heretofore been very difficult indeed to produce a billet of the type in question which after welding of the components together, heating and rolling produces fully satisfactory bimetallic strip.

The brittleness of the weld formed between the components of a high carbon steel billet clad with straight chrome type stainless steel has apparently been due to the incorporation in the weld metal of chromium from the stainless steel and carbon from the high carbon steel, the result being formation of a weld which is subject to cracking when the billet is heated and rolled or even upon cooling of the weld. Various attempts have been made to solve the problem including preheating and post-annealing of the billet, but these expedients have been unsatisfactory because they entail heating of the billet to a temperature at which undesirable oxides form on the surface of the stainless steel. Moreover, the preheating and post-annealing steps are costly and time consuming.

The weld between the billet components must not only seal the components together against ingress of air therebetween and hold the components together until they weld together during hot rolling but must be sufficiently ductile to withstand the differential expansion of the billet components during heating. The differential expansion tends to crack the weld and if the weld is brittle it will usually fracture. If a desirably ductile weld can be formed the metal of the weld itself will deform to some extent upon differential expansion of the billet components and will maintain the integrity of the billet.

We have discovered how to make a bimetallic billet having components of high carbon steel and straight chrome type stainless steel welded together so that the weld is free from the objectionable brittleness above referred to and is sufficiently ductile to withstand heating and rolling of the billet without cracking. By "high carbon steel" we mean steel containing at least about .30% carbon. By "straight chrome type stainless steel" we mean stainless steel containing chromium only as a corrosion inhibiting ingredient.

We provide a bimetallic billet comprising a component of steel containing at least about .30% carbon, a component of straight chrome type stainless steel containing at least about 10% chromium and weld means welding the components together and extending completely peripherally thereabout to exclude air from between the components, the weld means having an inner portion remote from the outside surface of the billet forming a relatively short bond between the components and an outer portion at the outside surface of the billet forming a relatively long bond between the components and cooperating with the components to completely enclose the inner portion of the weld, the outer portion of the weld having a zone at its junction with the first mentioned component in which carbon is present in substantial concentration, a zone at its junction with the second mentioned component in which chromium is present in substantial concentration and an intermediate zone of steel containing not over about .15% carbon and free from a substantial concentration of carbon and chromium so that the outer portion of the weld means is sufficiently ductile to withstand heating and rolling of the billet without cracking. Preferably one of the components is disposed with an edge thereof lying opposite a portion of a face of the other of said components spaced from an edge of said other component and the weld means preferably comprises fillet weld means in the corner defined by said edge of said one component and said face of said other component. Such a billet is found to preserve its integrity through heating and rolling and to solve the long existing problem in a very satisfactory way.

Desirably the high carbon steel component is the backing component of the bimetallic billet and the stainless steel component is the facing component; preferably the components are assembled with an edge of the facing component lying opposite a portion of a face of the backing component spaced from an edge thereof and fillet weld means are formed in the corner defined by said face of the backing component and the edge face of the facing component. The weld means may be formed in various ways. We may interpose a mass of steel containing not over about .15% carbon between a portion of the backing component and an edge of the facing component and join the components together by forming a weld comprising non-hardenable metal between the edge of the facing component and the backing component, the weld also being bonded to the mass of steel. Alternatively, we may form the weld means by a plurality of superposed welds, including weld metal joining the backing and facing components together which is desirably ductile and resists cracking or fracturing during heating and rolling.

Other details, objects and advantages of the invention will become apparent as the following description of certain preferred embodiments thereof proceeds.

Figure 2:
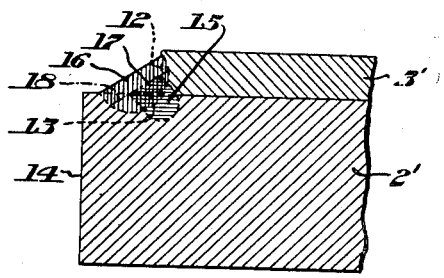

In the accompanying drawings we have shown certain present preferred embodiments of the invention in which Figure 1 is a somewhat diagrammatic fragmentary transverse cross-sectional view through a bimetallic billet; and Figure 2 is a view similar to Figure 1 showing a bimetallic billet formed somewhat differently than the billet shown in Figure 1 but having the same characteristics.

Referring now more particularly to Figure 1, we provide billet components 2 and 3. The component 2 is the backing component and is relatively thick as compared with the component 3, which is the facing component. The backing component is of high carbon steel. The facing component is of straight chrome type stainless steel, for example, 17% chromium stainless steel (AISI type 430) or 12% chromium stainless steel (AISI type 410). The backing component is preferably wider than the facing component and the components are preferably assembled symmetrically about the longitudinal axis of the billet. Thus while only one transverse half of the billet is shown the opposite half is preferably symmetrical therewith.

Interposed between the billet components 2 and 3 is a mass or sheet 4 of steel containing not over about .15% carbon. The width of the component 4 may be substantially the same as that of the component 2 but the component 3 is of materially less width, having an edge 5 thereof lying opposite a portion 6 of the upper face of the component 2 spaced from the edge 7 thereof. Thus there is provided a corner between the upper face of the component 2 (or the upper face of the component 4 which overlies the component 2) and the edge 5 of the component 3. In said corner we form a fillet weld to join or bond the components together. The fillet weld preferably extends the entire length of the billet and a similar fillet weld is preferably provided at the opposite side of the billet (not shown). The billet components are also welded together at both ends of the billet to form weld means welding the components together and extending completely peripherally thereabout to exclude air from between the components. The welds at the ends of the billet may be fillet welds or flush welds but in either case preferably have the characteristics of the welds at the sides of the billet.

Referring again to Figure 1, the fillet weld shown is desirably formed by use of a welding machine employing a travelling welding head. While it is possible to form a weld by the application of heat only we find it preferable to deposit weld metal which is non-hardenable, i. e., metal which does not become hard and brittle upon cooling from welding temperature. We obtain excellent results by use of a welding rod of steel containing not over about .15% carbon. We deposit metal from the welding rod in the corner between the edge 5 of the component 3 and the upper surface of the component 4 which lies upon the component 2. The deposited weld metal forms with the metal of the component 3 a weld zone 8 indicated by horizontal lines in the drawing, and the metal of the component 4, possibly including also some of the deposited weld metal, forms with the metal of the component 2 a weld zone 9 indicated by vertical lines in the drawing. The weld zones 8 and 9 merge and bond together and with the deposited weld metal 10, there being formed actually one continuous weld but having zones of somewhat different compositions.

Apparently employment of the component 4 prevents carbon from the component 2 from migrating to the same zone of the weld where chromium from the component 3 is present in substantial concentration. Likewise, chromium from the component 3 is prevented from migrating to the same zone of the weld where carbon from the component 2 is present in substantial concentration. The result is that the weld means has an inner portion below and to the right of the chain line 11 in Figure 1 remote from the outside surface of the billet forming a relatively short bond between the components and an outer portion above and to the left of the chain line 11 at the outside surface of the billet forming a relatively long bond between the components and cooperating with the components to completely enclose the inner portion of the weld, the outer portion of the weld having a zone at its junction with the component 2 in which carbon is present in substantial concentration, a zone at its junction with the component 3 in which chromium is present in substantial concentration and an intermediate zone of steel containing not over about .15% carbon and free from a substantial concentration of carbon and chromium so that the outer portion of the weld means is sufficiently ductile to withstand heating and rolling of the billet without cracking. We find that when we employ a mass or sheet of steel containing not over about .15% carbon such as that designated 4 in the drawing between a backing component of high carbon steel and a facing component of straight chrome type stainless steel containing at least about 10% chromium and weld the components together as we have explained the weld which is formed is sufficiently ductile that it maintains the integrity of the bimetallic billet throughout formation, heating and rolling without cracking. We are not sure of the theory of action but the mass or sheet 4 of steel containing not over about .15% carbon interposed between the components 2 and 3 as we have explained results in the successful welding together of such components.

Referring now more particularly to Figure 2, we provide billet components 2' and 3' which may be identical in composition and structure with the components 2 and 3 of Figure 1 and assembled in the same relationship except that in Figure 2 there is no mass or sheet 4 as there is in Figure 1. In Figure 2 the facing component 3' lies directly in contact with the backing component 2'. The components 2' and 3' are assembled with an edge 12 of the facing component lying opposite a portion 13 of the upper face of the backing component spaced from the edge 14 thereof. Thus there is provided a corner between the upper face of the backing component and the left-hand edge face 12 of the facing component viewing Figure 2 in which we form fillet weld means to fasten the components together. As will presently be explained, the fillet welds means of the structure shown in Figure 2 preferably comprise a plurality of superposed fillet welds. The fillet weld means preferably extend the entire length of the billet and similar fillet weld means are preferably provided at the opposite side of the billet (not shown). The billet components are also welded together at both ends of the billet to form weld means welding the components together and extending completely peripherally thereabout to exclude air from between the components. The welds at the ends of the billet may be fillet welds or flush welds but in either case preferably have the characteristics of the welds at the sides of the billet.

Referring again to Figure 2, the fillet weld shown is desirably formed by use of a welding machine employing a travelling welding head. Initially we deposit metal from the welding rod, which may be the same welding rod employed in formation of the billet of Figure 1, in the corner between the edge 12 of the component 3' and the upper surface of the component 2' to form a weld. Even though a welding rod of steel containing not over about .15% carbon is used the weld, which contains metal from the high carbon steel component 2' and metal from the stainless steel component 3', is undesirably brittle. A bimetallic billet formed with such a single weld will not ordinarily maintain its integrity during cooling of the weld and heating and rolling of the billet but will crack. Subsequently to the formation of the first weld as above described we form in similar manner a second weld superposed upon the first weld and using a similar welding rod. In the drawing we have endeavored to show generally the first weld by horizontal lines 15 and the second weld by vertical lines 16. However, the two welds merge together so that the resultant weld means is largely, if not entirely, made up partly of the weld metal of the first weld and partly of the weld metal of the second weld as indicated by the area 17 in the drawing having both vertical and horizontal lines.

The result is that the weld means has an inner portion below and to the right of the chain line 18 in Figure 2 remote from the outside surface of the billet forming a relatively short bond between the components and an outer portion above and to the left of the chain line 18 at the outside surface of the billet forming a relatively long bond between the components and cooperating with the components to completely enclose the inner portion of the weld, the outer portion of the weld having a zone at its junction with the component 2' in which carbon is present in substantial concentration, a zone at its junction with the component 3' in which chromium is present in substantial concentration and an intermediate zone of steel containing not over about .15% carbon and free from a substantial concentration of carbon and chromium so that the outer portion of the weld means is sufficiently ductile to withstand heating and rolling of the billet without cracking. The drawing is largely for purposes of explanation and we do not represent that the resultant weld structure will actually be precisely as it appears in the drawing. We are not sure of the theory of action but we do know that when a plurality of superposed welds are employed as above explained the resultant weld structure is sufficiently ductile to withstand heating and rolling of the billet without cracking. We believe that the metal of the first weld which normally is undesirably brittle is diluted by the metal of the second weld so that the resultant weld metal has the characteristics desired.

While we have shown and described certain present preferred embodiments of the invention it is to be distinctly understood that the invention is not limited thereto but may be otherwise variously embodied and practiced within the scope of the following claims.

We claim:

1. A bimetallic billet comprising a component of steel containing at least about .30% carbon, a component of straight chrome type stainless steel containing at least about 10% chromium and weld means welding the components together and extending completely peripherally thereabout to exclude air from between the components, the weld means having an inner portion remote from the outside surface of the billet forming a relatively short bond between the components and an outer portion at the outside surface of the billet forming a relatively long bond between the components and cooperating with the components to completely enclose the inner portion of the weld, the outer portion of the weld having a zone at its junction with the first mentioned component in which carbon is present in substantial concentration, a zone at its junction with the second mentioned component in which chromium is present in substantial concentration and an intermediate zone of steel containing not over about .15% carbon and free from a substantial concentration of carbon and chromium so that the outer portion of the weld means is sufficiently ductile to withstand heating and rolling of the billet without cracking.

2. A bimetallic billet comprising a component of steel containing at least about .30% carbon, a component of straight chrome type stainless steel containing at least about 10% chromium, one of the components being disposed with an edge thereof lying opposite a portion of a face of the other of said components spaced from an edge of said other component, and weld means welding the components together and extending completely peripherally thereabout to exclude air from between the components, the weld means comprising fillet weld means in the corner defined by said edge of said one component and said face of said other component and having an inner portion remote from the outside surface of the billet forming a relatively short bond between the components and an outer portion at the outside surface of the billet forming a relatively long bond between the components and cooperating with the components to completely enclose the inner portion of the weld, the outer portion of the weld having a zone at its junction with the first mentioned component in which carbon is present in substantial concentration, a zone at its junction with the second mentioned component in which chromium is present in substantial concentration and an intermediate zone of steel containing not over about .15% carbon and free from a substantial concentration of carbon and chromium so that the outer portion of the weld means is sufficiently ductile to withstand heating and rolling of the billet without cracking.

WILLIAM A. CARLSON.
WALTER A. KEIL.

REFERENCES CITED

The following references are of record in the file of this patent:

UNITED STATES PATENTS

| Number | Name | Date |
|---|---|---|
| 1,938,633 | Maskrey | Dec. 12, 1933 |
| 1,967,754 | Ingersoll | July 24, 1934 |
| 1,997,538 | Armstrong | Apr. 9, 1935 |
| 2,018,725 | Johnson | Oct. 29, 1935 |
| 2,034,278 | Beckett | Mar. 17, 1936 |
| 2,054,770 | Kautz | Sept. 15, 1936 |
| 2,074,352 | Armstrong | Mar. 23, 1937 |
| 2,232,656 | Davis | Feb. 18, 1941 |
| 2,233,455 | Larson | Mar. 4, 1941 |

FOREIGN PATENTS

| Number | Country | Date |
|---|---|---|
| 407,942 | Great Britain | Mar. 26, 1934 |